United States Patent
Piquette

[11] 3,908,483
[45] Sept. 30, 1975

[54] PLANETARY REVERSE TRANSMISSION

[76] Inventor: Gerald Piquette, 295, St.-Cyrille, C.p. 384, Normandin, Province de Quebec, Canada

[22] Filed: Sept. 17, 1973

[21] Appl. No.: 397,647

Related U.S. Application Data

[63] Continuation-in-part of Ser. No. 325,152, Jan. 9, 1973, abandoned.

[52] U.S. Cl. ............... 74/792; 192/109 D; 192/55; 192/103 C
[51] Int. Cl.² F16H 3/44; F16D 23/10; F16D 11/00
[58] Field of Search ............ 74/792, 230.17 M; 192/103 B, 104 B, 105 BA, 109 D, 55, 103 C

[56] References Cited
UNITED STATES PATENTS

| | | | |
|---|---|---|---|
| 846,182 | 3/1904 | Boughton | 74/792 X |
| 1,762,799 | 6/1930 | Starkey | 192/103 C |
| 2,445,590 | 7/1944 | Stephenson | 192/103 C X |
| 2,694,281 | 11/1954 | Beck | 74/792 X |
| 2,829,748 | 1/1957 | Sacchini et al. | 192/103 C X |
| 2,911,962 | 11/1959 | McRae | 192/104 B |
| 3,552,904 | 1/1971 | De Lancey | 192/109 D |
| 3,563,114 | 7/1971 | Casale | 74/792 |
| 3,688,604 | 9/1972 | Schlosser | 74/792 |
| 3,709,051 | 1/1973 | Boissin | 74/230.17 M |

*Primary Examiner*—Samuel Scott
*Assistant Examiner*—P. S. Lall
*Attorney, Agent, or Firm*—Raymond A. Robic; Peter G. Mack; Arthur Schwartz

[57] ABSTRACT

A power transmission incorporating planetary gearing with its sun gear connected to the input, and its internal gear connected to the output. An expansible inertia clutch comprising resilient means for absorbing shocks when reversing is incorporated between input and output. A brake is connected to the planet gear carrier and reversing is obtained by the application of said brake.

6 Claims, 5 Drawing Figures

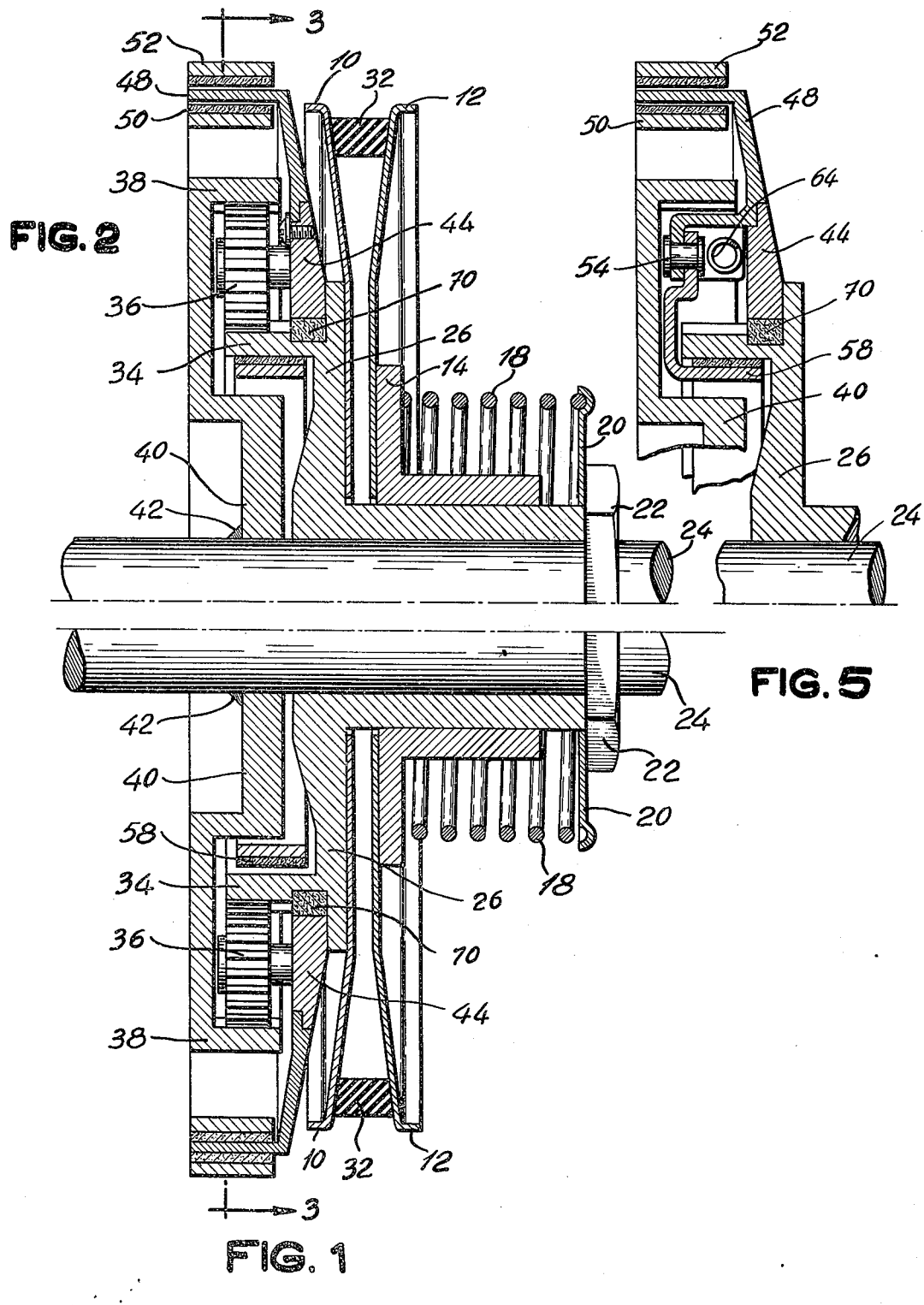

PLANETARY REVERSE TRANSMISSION

This application is a continuation-in-part of application Ser. No. 325,152, filed Jan. 19, 1973, and now abandoned.

The present invention relates to power transmissions, particularly those used in connection with snowmobiles and similar light weight vehicles.

Power transmissions for such vehicles usually consist of expansible plate V-belt pulleys associated with a centrifugal clutch which only engages above a certain speed of rotation of the engine and is disengaged in the idling condition of the engine.

Many vehicles of this type are not provided with a reverse. Those that are usually comprise reversing gears which have to be disengaged in forward drive position as well as forward gears which similarly have to be disengaged in reverse. The provision of such gears is cumbersome and requires a substantial amount of space. In addition, the vehicle has to be brought to a full stop to prevent stripping of the forward and reversing gears and an unskilled operator may often fail to do so especially when trying to maneuver out of a difficult situation which may require rapid back and forth movement of the vehicle.

The present invention seeks to overcome the aforementioned disadvantages.

There is provided according to the invention a power transmission comprising planetary gearing including a sun gear, planet gears journalled on a carrier and an internal gear, input means connected to the sun gear, an output member connected to the internal gear, connecting means connecting the internal gear to the input means, a brake connected with the planet gear carrier, and an expansible inertia clutch with resilient means to absorb shock when reversing by the application of the brake.

It will be seen that with this arrangement, the reversing function is served by the planetary gear which is of flat construction taking up a very small amount of space. In addition, the sun gear, planet gears and internal gear of the planetary gearing are always in engagement so that accidental stripping of the gears is positively prevented. Furthermore, the brake which is connected to the carrier can be applied even while the input is still moving forward so that the engine does not have to be cut down to idling where it may stall, and so that faster reversing and faster shifting to forward drive again are made possible. As aforementioned, only a single operating means is required to operate the brake, which makes the operation of putting the vehicle in reverse highly convenient. The device can also be used to obtain faster stops since the operator can shift to reverse at any forward speed of the vehicle if an emergency requires it.

Further according to the invention, the input means is an expansible V-belt pulley having one plate thereof connected to the sun gear.

Preferably, according to the invention, the connecting means comprises an expansible inertia clutch between sun gear and the one V-belt pulley plate.

More specifically, the clutch comprises a member with resilient means to frictionally engage the sun gear with the V-belt plate when the brake is applied for the reverse.

Further according to the invention, the brake is preferably a disk or drum brake comprising a fixed shoe and a movable shoe with a disk therebetween connected to the planet carrier, the brake operating member comprising means connected to the movable shoe to urge the latter into braking engagement with the disk.

Further according to the invention, the output member is a shaft carrying the internal gear rigidly connected thereto and the V-belt pulley is rotatably mounted on the said shaft.

A preferred embodiment of the invention is illustrated by way of example in the accompanying drawings in which FIG. 1 is a half axial section of a power transmission according to the invention showing the brake applied for reverse FIG. 2 is a half axial section showing the transmission in forward drive.

FIG. 5, is a section on line 4—4 of FIG. 3 showing the clutch in contact with the sun gear for forward drive.

Figure 3:
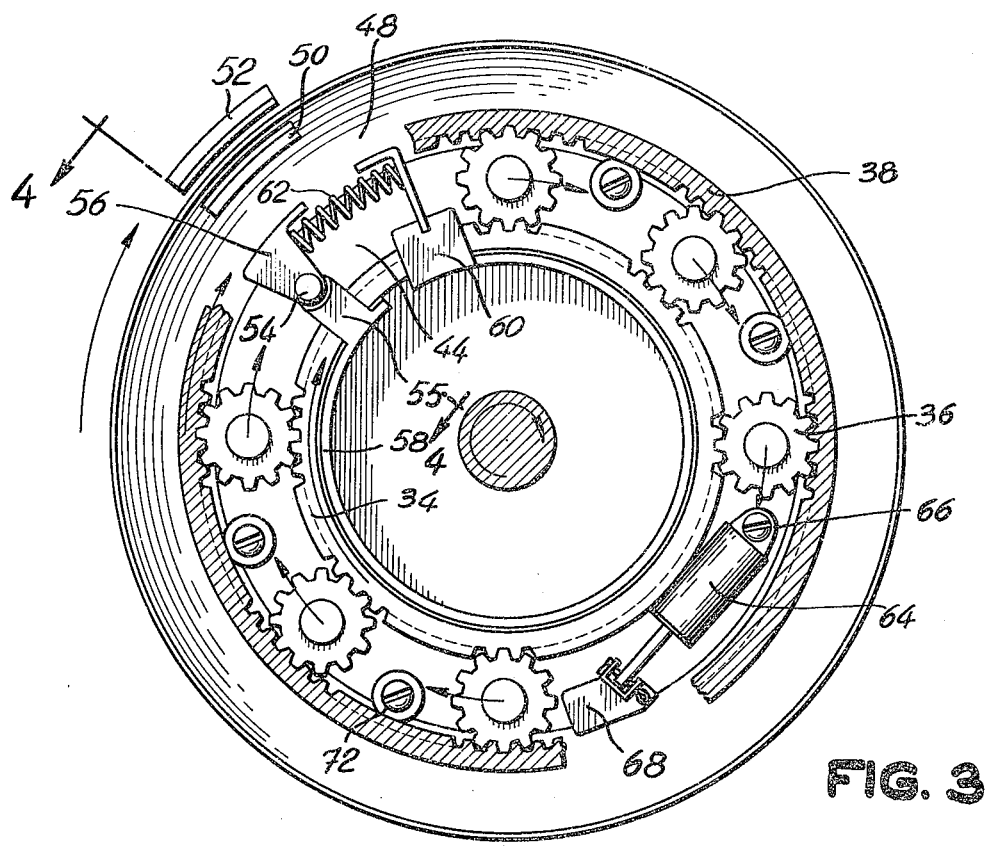
FIG. 3 is a section on line 3—3 of FIG. 1 showing the brake shoes and the clutch shock absorbing device with clutch expanded for forward drive

Referring to the drawings, the power transmission according to the invention comprises an expansible V-belt pulley consisting of a fixed plate 10 and a movable plate 12 connected to a hub 14 which is urged through the intermediary of a bearing, by a compression coil spring 18 towards the fixed plate 10. Coil spring 18 is backed by a washer 20 held in place by means of a nut 22 on the end of an output shaft 24.

Fixed plate 10 is secured to a hub 26 integral with a bushing, rotatably mounted on the shaft 24. Hub 14 is integral with a bushing rotatably slidably mounted on hub 26.

A belt 32 drives the pulley plates 10 and 12. Belt 32 is connected to a conventional V-belt pulley structure (not shown) driven by an engine which is similarly not shown.

Hub 26 carries a sun gear 34 meshing with a number of planet gears 36 meshing in turn with an internal gear 38 integral with a hub 40 held fixedly at 42 on shaft 24.

Planet gears 36 are rotatably mounted on a carrier 44 journalled on hub 26. Carrier 44 frictionally engages with a separate braking disk 48 which rotates between a fixed brake shoe 50 secured to a brake clamp not shown and a movable shoe 52.

OPERATION

In forward drive shown in FIGS. 1 and 3, belt 32 drives pulley plates 10 and 12. Drive is transmitted through hub 26, to the inertia clutch 58 and, sun gear 34 to the planet gears and internal gear 38 and hub 40 to the output shaft 24.

When it is desired to shift into reverse, the brake 50–52 is applied and drum 48 stops while the planetary disk 44 continues momentarily its forward motion sliding past drum 48 and contracting the inertia clutch (through mechanism described below) permitting the planet carrier to stop and the planet gears to rotate and the external gear 38 and shaft 24 rotates in the direction shown in FIG. 4. Spring 62 is compressed and the dash pot 64 absorbs the reversing shocks. Motion is therefor transmitted to shaft 24. The braking disk 48 is thus squeezed on both sides by shoes 52 and 50 and a braking effect is gradually applied thereto. As the braking effect is applied, the carrier 44, which was previously being rotated through hub 26, sun gear 34 and planet gears 36, the latter being entrained in planetary motion but without rotation, as shown in FIG. 3 is gradually slowed down and finally brought to a stop. As a result, the sun gear 34 gradually begins to rotate planet gears 36 which in turn rotate the internal gear 38 in reverse direction. Reverse torque is then applied from internal gear 38 through hub 40 to shaft 24.

Carrier 44 is joined to the braking disk 48 by means of part 56 welded to the said disk and one end of the clutch band 58 by means of the part 55 and pinned at 54. The other end of the clutch band 60 is welded to the carrier 44. A compression spring 62 keeps the clutch band 58 in frictional contact with the external gear 34.

A dash pot 64 hinged at 66 to the carrier 44 and welded to the brake disk 48 absorbs shocks resulting from the passing of forward to reverse and vice versa.

Figure 4:
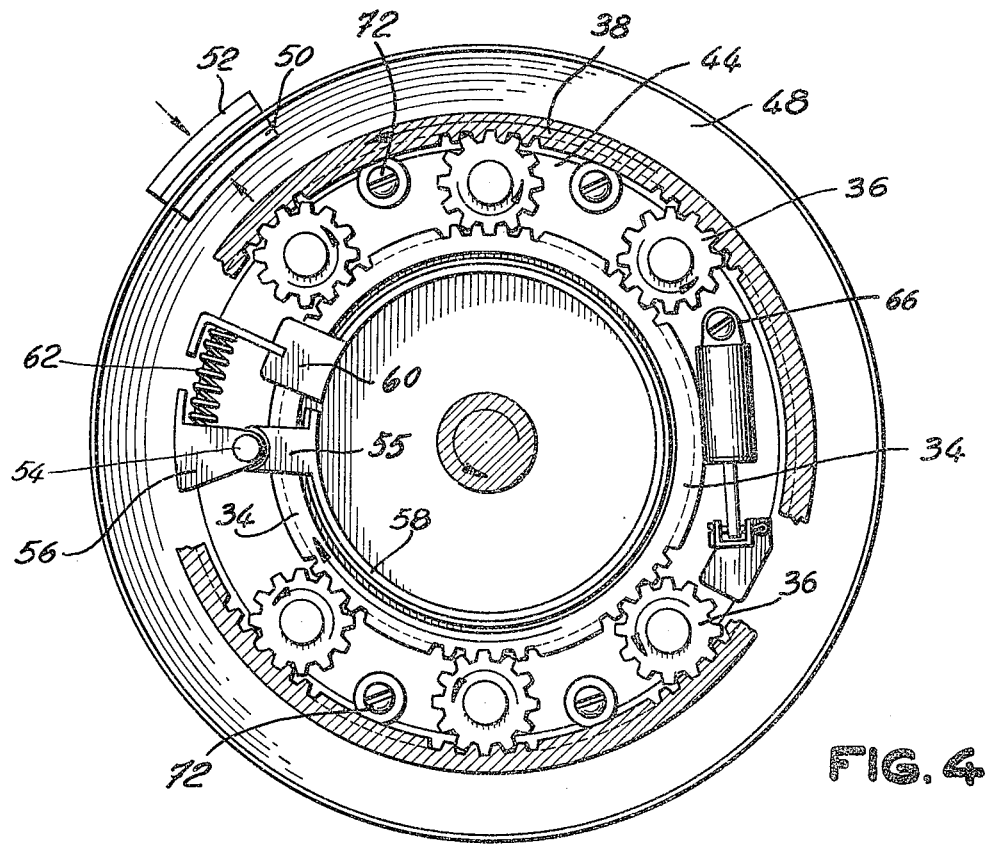
FIG. 4 is a cross-section similar to FIG. 3 but the inertia clutch is contracted for the reverse position 1

When the brake is applied carrier 44 slides momentarily past brake disk 48 compressing the clutch 58 as shown in FIG. 4 thereby allowing reversing and carrier 44 will be driven by frictional band 70. Carrier 44 has round head screws 72 holding brake disk 48 against the said carrier.

As soon as the pressure on the brake shoes 52 and 50 is released forward drive torque is thus gradually applied from hub 26 to drive shaft 24 again to forward drive.

Spring 18 serves to regulate the spacing of pulley plates 10 and 12 and the corresponding position of belt 32 in a well-known manner.

I claim:

1. In a power transmission comprising a planetary gear set having a sun gear, a rotary carrier having planet gears journalled thereon in mesh with said sun gear, an internal gear in mesh with said planet gears, input drive means connected to said sun gear, and output means connected to said internal gear, the improvement comprising:

brake means including a braking member rotatable with said carrier and connected thereto for limited rotation relative to said carrier;

releasable clutch means normally drivingly connecting said sun gear to said carrier for forward drive; and means responsive to said limited relative rotation between said braking member and said carrier in one direction, upon actuation of said brake means, to disable said clutch means and stop said carrier to establish reverse drive.

2. A transmission as defined in claim 1 including friction means, other than said clutch, resisting relative rotation between said sun gear and said carrier.

3. A transmission as defined in claim 2 including a dashpot device arranged to resist relative rotation between said braking member and said carrier.

4. A transmission as defined in claim 1 wherein said input means is an expansible V-belt pulley having one plate thereof fixed to said sun gear.

5. A transmission as defined in claim 4 wherein said clutch means comprises a band clutch frictionally engaging a cylindrical surface of said sun gear, one end of the clutch band being fixed to said carrier and the other end being fixed to said braking member.

6. A transmission as defined in claim 5 including spring means urging said clutch band into frictional engagement with said cylindrical surface.

* * * * *